(12) United States Patent
Konno et al.

(10) Patent No.: US 11,235,671 B2
(45) Date of Patent: Feb. 1, 2022

(54) ELECTRICALLY POWERED VEHICLE

(71) Applicant: TOYOTA JIDOSHA KABUSHIKI KAISHA, Toyota (JP)

(72) Inventors: Ikuru Konno, Toyoake (JP); Takenori Kubo, Okazaki (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 27 days.

(21) Appl. No.: 16/911,957

(22) Filed: Jun. 25, 2020

(65) Prior Publication Data

US 2020/0406764 A1 Dec. 31, 2020

(30) Foreign Application Priority Data

Jun. 28, 2019 (JP) .............................. JP2019-121197

(51) Int. Cl.
*B60K 1/04* (2019.01)
*B60L 50/60* (2019.01)
*B60L 53/16* (2019.01)
*B60K 11/02* (2006.01)
*B60R 16/04* (2006.01)

(52) U.S. Cl.
CPC ................ *B60L 50/66* (2019.02); *B60K 1/04* (2013.01); *B60K 11/02* (2013.01); *B60L 53/16* (2019.02); *B60R 16/04* (2013.01); *B60K 2001/0438* (2013.01)

(58) Field of Classification Search
CPC .......... B60L 50/56; B60L 53/16; B60K 1/04; B60K 11/02; B60R 16/04
See application file for complete search history.

(56) References Cited

U.S. PATENT DOCUMENTS

| | | | | |
|---|---|---|---|---|
| 8,505,662 | B2 * | 8/2013 | Schwarz | B60R 16/04 180/68.5 |
| 8,863,878 | B2 * | 10/2014 | Shiraoka | B60L 50/66 180/68.5 |
| 8,936,126 | B2 * | 1/2015 | Nitawaki | B60K 1/04 180/68.5 |
| 10,369,881 | B2 * | 8/2019 | Kunii | B60K 6/40 |
| 11,097,778 | B2 * | 8/2021 | Yoshimoto | B62D 21/02 |
| 2012/0055722 | A1 * | 3/2012 | Matsuzawa | B60L 50/66 180/65.21 |

FOREIGN PATENT DOCUMENTS

JP 2011-005889 A 1/2011

* cited by examiner

*Primary Examiner* — James A Shriver, II
*Assistant Examiner* — James J Triggs
(74) *Attorney, Agent, or Firm* — Sughrue Mion, PLLC (57) ABSTRACT

An electrically powered vehicle having a generally rectangular appearance includes a rear seat disposed in a rear of a cabin of the vehicle; a main battery disposed under a floor in a center of the cabin; a power unit compartment disposed below the rear seat; a driving motor disposed in the power unit compartment; a PCU disposed above the driving motor; an ECU disposed above the PCU; and an auxiliary battery disposed in the power unit compartment.

5 Claims, 7 Drawing Sheets

ELECTRICALLY POWERED VEHICLE

CROSS REFERENCE TO RELATED APPLICATION

This application claims priority to Japanese Patent Application No. 2019-121197 filed on Jun. 28, 2019, which is incorporated herein by reference in its entirety including the specification, claims, drawings, and abstract.

TECHNICAL FIELD

The present specification discloses an electrically powered vehicle having a generally rectangular appearance.

BACKGROUND

There have been known electrically powered vehicles that incorporate a driving motor serving as a power source. Such an electrically powered vehicle incorporates, in addition to the driving motor, for example, a main battery for supplying power to the driving motor, a power control unit (PCU) for controlling power distribution, an auxiliary battery for supplying power to auxiliary devices, and an electronic control unit (ECU) for controlling vehicle-mounted actuators. There have been proposed techniques for placing these components efficiently.

For example, JP 2011-005889 A discloses a hybrid electric vehicle that uses an engine and a driving motor as power sources. In the structure disclosed in JP 2011-005889 A, an engine, a driving motor, and an inverter (typically incorporated in a PCU) are mounted within an engine compartment that is disposed in the front of a vehicle. Further, in the structure disclosed in JP 2011-005889 A, a main battery and an auxiliary battery are disposed below a rear seat.

The technique disclosed in JP 2011-005889 A enables effective use of a space under the rear seat. However, in the layout disclosed in JP 2011-005889 A, as the driving motor and the inverter are disposed in the front of the vehicle, and as the main battery and the auxiliary battery are disposed in the rear of the vehicle, the batteries are located a long distance away from the motor and the inverter. As a result, in the structure disclosed in JP 2011-005889 A, electric wires that electrically connect the driving motor, the inverter, the main battery, and the auxiliary battery tend to be long and complicated. Further, the structure disclosed in JP 2011-005889 A is designed for use in passenger automobiles. As such, it is difficult to apply the technique disclosed in JP 2011-005889 A to an electrically powered vehicle having a generally rectangular appearance, such as a bus.

Against this backdrop, the present specification discloses an electrically powered vehicle having a generally rectangular appearance in which electrical wiring can be simplified.

SUMMARY

An electrically powered vehicle disclosed in the present specification has a generally rectangular appearance. The electrically powered vehicle includes a seat disposed in a front or a rear of a cabin of the vehicle for allowing a vehicle occupant to sit thereon facing toward a center in the front-to-rear direction of the vehicle; a main battery disposed under a floor in a center of the cabin; a power unit compartment disposed below the seat, the power unit compartment being separated from the cabin; a driving motor disposed in the power unit compartment; a PCU disposed in the power unit compartment and above the driving motor for controlling power distribution; an ECU disposed in the power unit compartment and above the PCU for controlling one or more actuators mounted on the vehicle; and an auxiliary battery disposed in the power unit compartment.

As the driving motor, the PCU, the ECU, and the auxiliary battery are all disposed in the power unit compartment located below the seat, and as the main battery is disposed under the floor in the center of the cabin, the space below the seat can be used effectively, and electric wires can be simplified and shortened.

The electrically powered vehicle may further include a heat exchange unit including a heat exchanger and an electric fan. The heat exchange unit may be disposed in the power unit compartment and more toward the outside in the front-to-rear direction of the vehicle than the driving motor. An outer end of the heat exchange unit as viewed in the front-to-rear direction of the vehicle may be located more toward the outside in the front-to-rear direction of the vehicle than the ECU.

With this structure, the ECU, which is costly, can be protected from collision loads. More specifically, the heat exchanger is typically stiff and robust as it is made of metal. As the outer end of the heat exchange unit including the heat exchanger as viewed in the front-to-rear direction of the vehicle is located more toward the outside in the front-to-rear direction of the vehicle than the ECU, most collision loads are not input to the ECU and are received by the heat exchange unit. As a result, the ECU, which is costly, can be protected from collision loads.

The electrically powered vehicle may further include a sub-battery disposed in the power unit compartment for outputting power when the auxiliary battery has lost power. The auxiliary battery and the sub-battery may be disposed more toward the inside in the front-to-rear direction of the vehicle than the driving motor.

As the sub-battery is provided, the reliability of the vehicle can be further improved. As the auxiliary battery and the sub-battery are disposed more toward the inside in the front-to-rear direction of the vehicle than the driving motor, these batteries can be protected from collision loads.

The electrically powered vehicle may further include a charging port electrically connected to the PCU for allowing insertion of an external power supply charging plug. The power unit compartment may be disposed in a front bottom part of the vehicle, and the charging port may be disposed on an outer surface in the front of the vehicle. Alternatively, the power unit compartment may be disposed in a rear bottom of the vehicle, and the charging port may be disposed on an outer surface in the rear of the vehicle.

As the charging port is disposed on the same side as the side on which the power unit compartment is disposed as viewed in the front-to-rear direction, an electric wire that connects between the charging port and the PCU can be shortened.

The electrically powered vehicle may further include a partition disposed in the power unit compartment and between the ECU and the PCU for separating spaces where the ECU and the PCU are placed.

As the partition is provided, heat transfer between the ECU and the PCU can be retarded, and heat generated from one of the ECU and the PCU can be prevented from adversely affecting the other.

According to the techniques disclosed in the present specification, there is provided an electrically powered vehicle having a generally rectangular appearance in which various types of electric wires can be simplified.

BRIEF DESCRIPTION OF DRAWINGS

Embodiments of the present disclosure will be described based on the following figures, wherein.

DESCRIPTION OF EMBODIMENTS

A structure of a vehicle 10 will be described below with reference to the accompanying drawings. In the drawings that are referred to in the following description, "Fr", "Up", and "L" respectively denote a direction toward the front of the vehicle, an upward direction of the vehicle, and a direction toward the left in the vehicle width direction.

Figure 1:
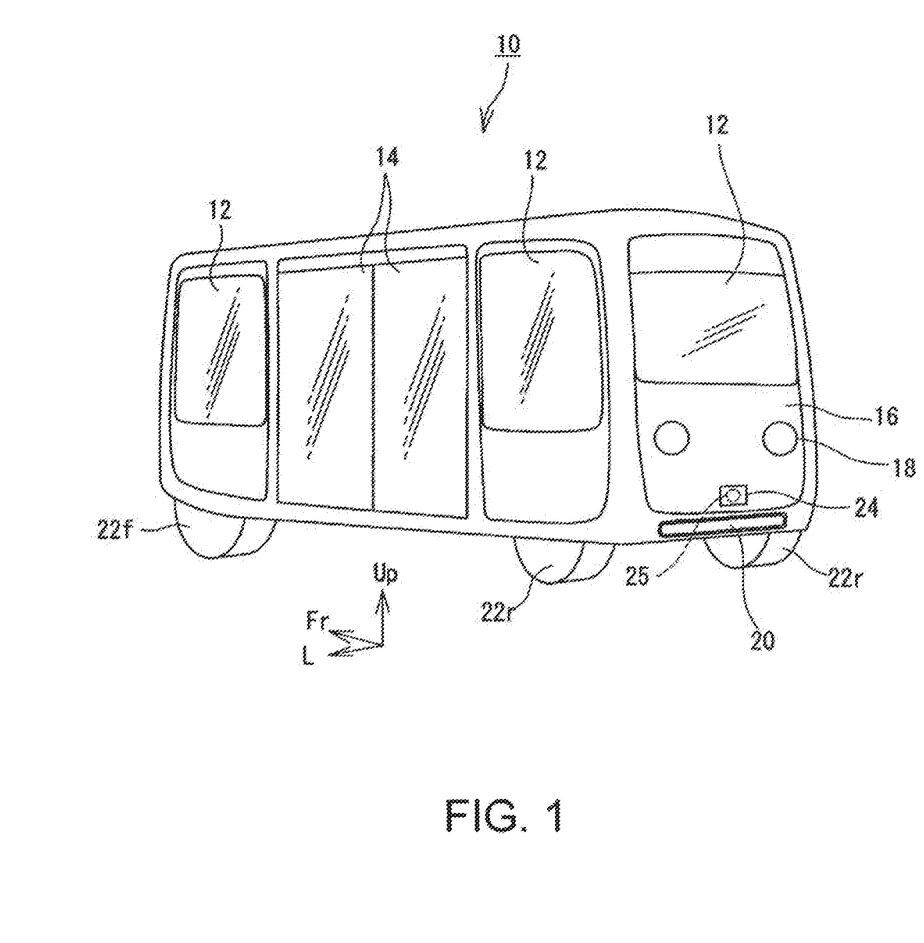
FIG. 1 is a perspective view of a vehicle as viewed from the outside.
Figure 2:
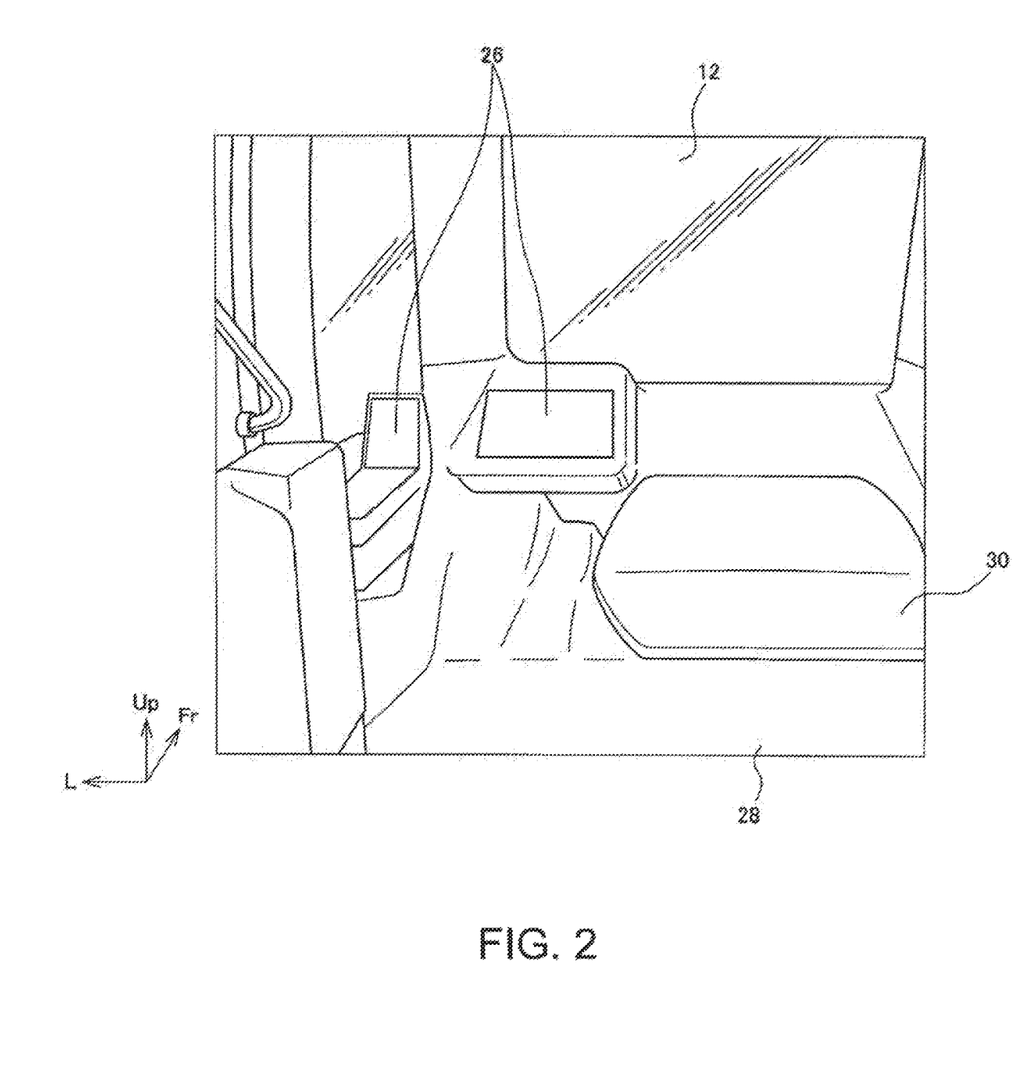
FIG. 2 is a perspective view as viewed from the center of the cabin toward the front of the cabin.
Figure 3:
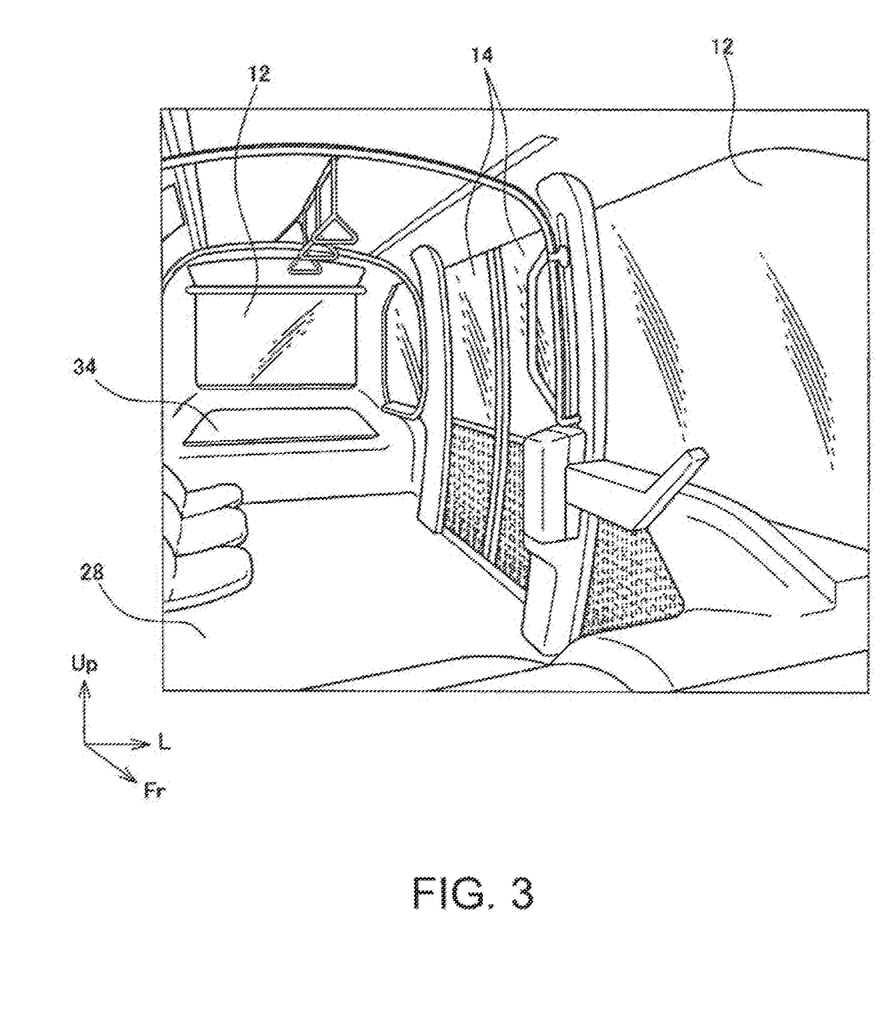
FIG. 3 is a perspective view as viewed from the front of the cabin toward the rear of the cabin.
Figure 4:
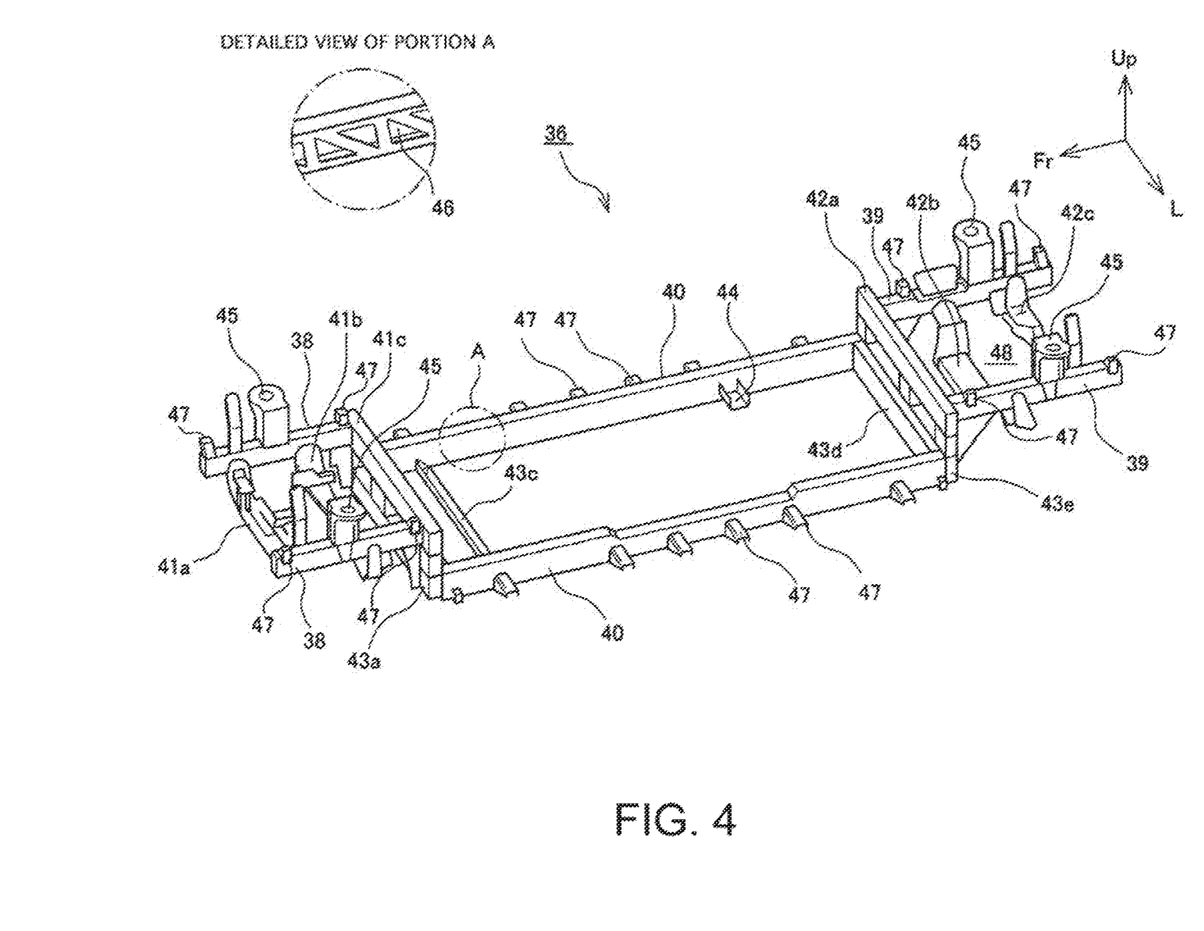
FIG. 4 is a perspective view of a main frame.

An overall structure of the vehicle 10 will first be described briefly with reference to FIGS. 1 to 4. FIG. 1 is a perspective view of the vehicle 10 as viewed from the outside. FIG. 2 is a perspective view as viewed from the center of the cabin toward the front of the cabin, and FIG. 3 is a perspective view as viewed from the front of the cabin toward the rear of the cabin. FIG. 4 is a perspective view of a main frame 36 of the vehicle 10.

The vehicle 10 is used as a bus that carries passengers while traveling along a predefined route in a particular site by automated driving technology. However, the vehicle 10 disclosed in the present specification may be used in any modified manner as desired. For example, the vehicle 10 may also be used as a mobile business space. For example, the vehicle 10 may also be used as a shop such as a retail store where various types of goods are displayed and sold or a restaurant where foods and drinks are prepared and served. In another embodiment, the vehicle 10 may also be used as an office where users, for example, perform desk work or conduct meetings with customers. The vehicle 10 may also be used as a transportation vehicle such as a taxi or a bus that carries passengers and/or cargo. The vehicle 10 is not limited to business use. For example, the vehicle 10 may also be used as a private means of transportation. The traveling pattern or the traveling speed of the vehicle 10 may also be changed as desired.

The vehicle 10 is an electric vehicle that includes a driving motor 56 (see FIGS. 5 and 7) as a prime motor, and a main battery 50 (see FIGS. 5 to 7) for supplying power to the driving motor 56 is incorporated under the floor of the vehicle 10. As illustrated in FIG. 1, the vehicle 10 has a generally rectangular appearance whose front and rear ends extend in a generally vertical direction, without a hood or a trunk. The vehicle 10 has a pair of front wheels 22f near the front end and a pair of rear wheels 22r near the rear end. The vehicle 10 has large windows 12 on side surfaces. In the middle of the left side surface, the vehicle 10 has double sliding doors 14 that open and close as one of them slides toward the front of the vehicle and the other toward the rear of the vehicle.

The vehicle 10 has a charging port 25 on the rear surface. The charging port 25 is a connector into which a charging plug for an external power supply is inserted when the main battery 50 is charged with external power, which is often called a charging inlet. The charging port 25 is disposed within a lid box which is a recess formed in the rear surface of the vehicle 10, and the lid box is covered by a charging lid 24 so that it can be opened or closed when desired.

The rear surface of the vehicle 10 has a window 12 and a lamp placement portion 16 that is located below the window 12. The lamp placement portion 16 has signal lamps 18 for notifying people outside the vehicle of the presence and behavior of the vehicle by means of light. A grille 20 for introducing outside air into the vehicle is provided on the lower end of the lamp placement portion 16. The front surface of the vehicle 10 has substantially the same configuration as the rear surface of the vehicle. That is, a window 12 and a lamp placement portion 16 are respectively disposed above and below each other, and a grille 20 is placed on the lower end of the lamp placement portion 16. As such, the front and the rear of the vehicle 10 according to this example have appearances that are substantially symmetric to each other.

As illustrated in FIG. 2, the front of the cabin of the vehicle 10 has an operation panel 26 for receiving commands from an operator. The front of a floor panel 28 has an upward raised portion that forms a front seat 30 on which a vehicle occupant can sit facing toward the rear of the vehicle. Similarly, as illustrated in FIG. 3, the rear of the floor panel 28 has a raised portion that forms a rear seat 34 on which a vehicle occupant can sit facing toward the front of the vehicle. Portions below the front seat 30 and the rear seat 34, that is, the front bottom and the rear bottom of the vehicle 10, have compartments that are separated from the cabin. Of these, the rear compartment serves as a power unit compartment that houses a power unit including the driving motor 56, which will be described later.

The vehicle 10 according to the illustrated example has a body-on-frame construction with a box-shaped body mounted on the main frame 36 which is shaped like a ladder. The front of the main frame 36 includes a pair of front side members 38 that extend in the front-to-rear direction of the vehicle and a plurality of front cross members 41a, 41b, and 41c that connect between the pair of front side members 38. Suspension towers 45 to which air suspensions (not illustrated) are attached stand upright from top surfaces of the front side members 38.

Similarly, as in the front, the rear of the main frame 36 also includes a pair of rear side members 39 that extend in the front-to-rear direction of the vehicle and a plurality of rear cross members 42a, 42b, and 42c that connect between the pair of rear side members 39. Suspension towers 45 to which air suspensions are attached stand upright from top surfaces of the rear side members 39.

A center portion of the main frame 36 includes a pair of center side members 40 that extend in the front-to-rear direction of the vehicle and a plurality of center cross members 43a, 43b (not seen in FIG. 4), 43c, 43d, and 43e that connect between the pair of center side members 40. The two center cross members 43a and 43b connect between front ends of the pair of center side members 40, and the two center cross members 43d and 43e connect between rear ends of the pair of center side members 40. The center cross member 43c and a pair of brackets 44 (only one of the pair seen in FIG. 4) for supporting the main battery 50 are disposed between the center cross member 43b and the center cross member 43d.

As can be clearly seen in FIG. 4, the front side members 38 and the rear side members 39 are located at heights above the center side members 40. The front seat 30 is disposed above the front side members 38, and the rear seat 34 is disposed above the rear side members 39. As such, a space where, for example, the rear side members 39 and the rear cross members 42 are disposed, constitutes a power unit compartment 48 that houses a power unit.

The cross and side members, except the center cross member 43c, are in the form of a square pipe having a rectangular cross section. Although FIG. 4 illustrates all side and cross members in a simplified form, as illustrated in a detailed view of portion A in FIG. 4, all of these members have through holes 46 (in the illustrated example, triangular holes) on their side surfaces or top and bottom surfaces. The formation of these through holes 46 can result in a significant reduction in weight of the main frame 36. Additionally, the formation of the through holes 46 allows some wires or pipes to be passed inside the square pipe side or cross members via the through holes 46.

The main frame 36 having the above-described structure, including, for example, a motor, a power transmission, a brake, running gear, a suspension, steering gear, and an electrical system mounted thereon, forms a chassis. A box-shaped body is mounted on this main frame 36. The side members 38, 39, and 40 have a plurality of cab mount brackets 47 that are formed to project from their outer surfaces so that the body is mounted and fixed on them.

Figure 5:
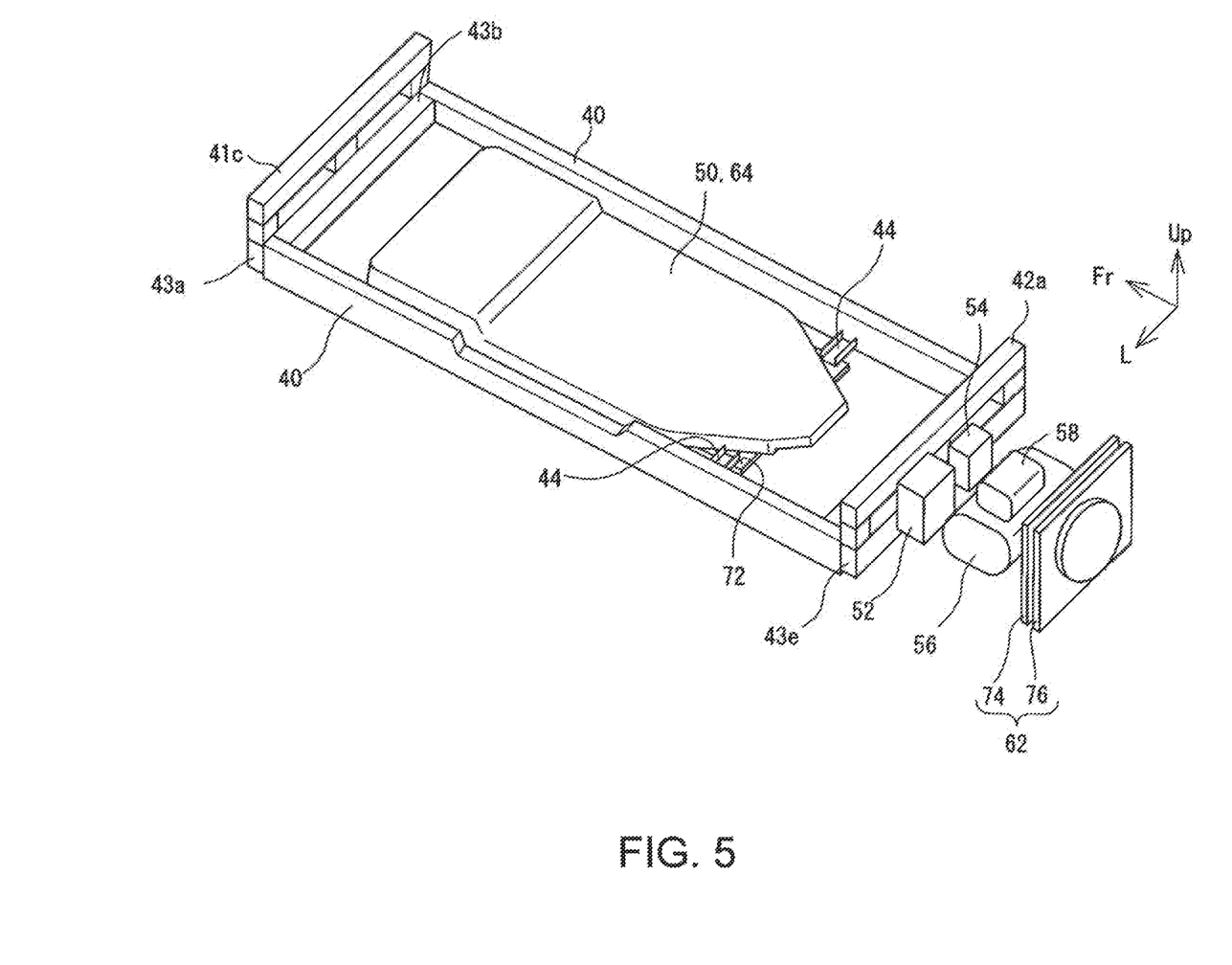
FIG. 5 is a schematic perspective view of the bottom of the vehicle that illustrates the placement of main components.
Figure 6:
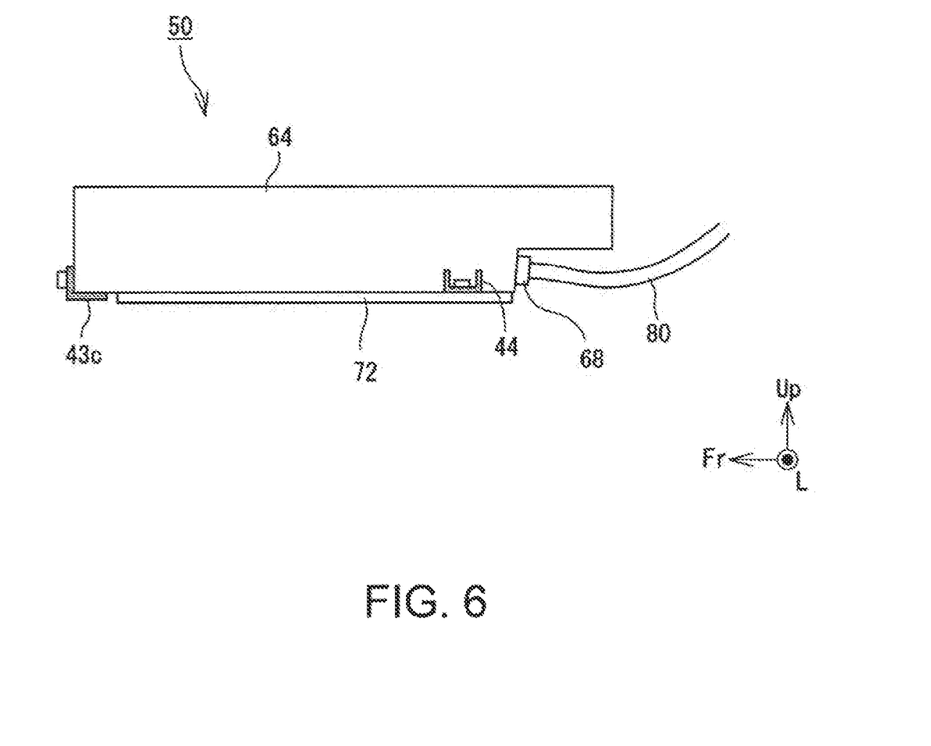
FIG. 6 is a schematic side view of a main battery.
Figure 7:
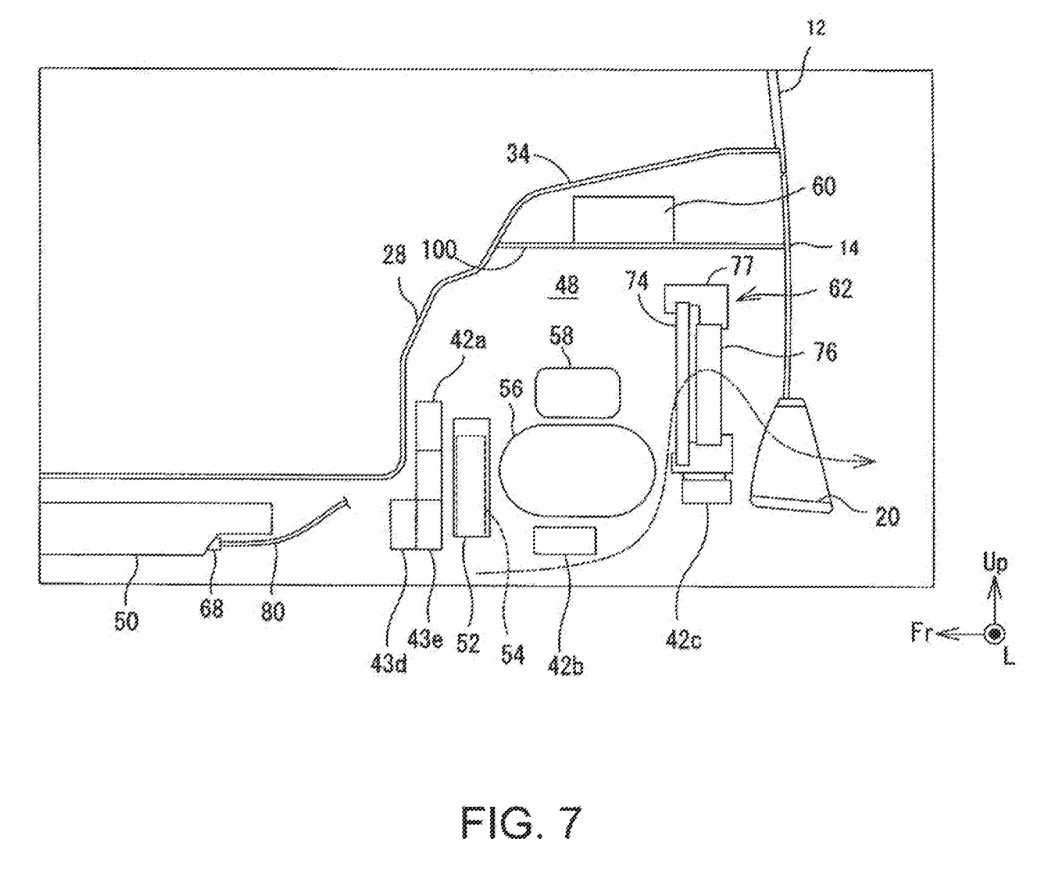
FIG. 7 is a schematic cross-sectional view of the rear bottom of the vehicle.

Next, the placement of main components will be described below with reference to FIGS. 5 to 7. FIG. 5 is a schematic perspective view of the bottom of the vehicle that illustrates the placement of main components. FIG. 6 is a schematic side view of the main battery 50. FIG. 7 is a schematic cross-sectional view of the rear bottom of the vehicle. As described above, and as illustrated in FIG. 5, the main battery 50 according to this example is disposed under the floor of the center portion of the cabin and between the pair of center side members 40. The main battery 50 has a flat battery case 64 and a battery frame 72 that is attached to the bottom of the battery case 64. As illustrated in FIG. 6, the battery case 64 has a terminal 68 near the rear end (in other words, the end closer to the power unit compartment 48) to which an electric wire 80 can be detachably attached. The electric wire 80 extends from the terminal 68 toward the rear, or, in other words, toward the power unit compartment 48. The front end of the battery case 64 is placed on the center cross member 43c having an L-shaped cross section and is fastened with screws. The pair of brackets 44 are fastened with screws near the rear end of the battery frame 72 and hold the main battery 50 in a suspended manner.

As described above, the power unit compartment 48 is formed below the rear seat 34. As illustrated in FIG. 7, a top panel and a vehicle front-to-rear direction inner end panel of the power unit compartment 48 are formed by a portion of the floor panel 28. This portion of the floor panel 28 may have an opening through which the power unit compartment 48 is accessible from inside the cabin. Naturally, such a structure includes a removable cover that is attached to the opening.

For example, the driving motor 56, a power control unit 58 (hereinafter referred to as "PCU 58"), an electronic control unit 60 (hereinafter referred to as "ECU 60"), an auxiliary battery 52, a sub-battery 54, and a heat exchange unit 62 are disposed in the power unit compartment 48. The ECU is illustrated only in FIG. 7 and is not illustrated in FIG. 5. The driving motor 56 is a motor that generates power for driving the vehicle 10. A case for the driving motor 56 may further house a transaxle having a plurality of gears, along with the driving motor 56. The driving motor 56 may also serve as a generator that generates electricity by means of braking force. In the illustrated example, the driving motor 56 is placed and fixed above the rear cross member 42b with a motor mount (not illustrated) between them.

The PCU 58 is disposed above the driving motor 56. The PCU 58 is configured to control power distribution and includes, for example, an inverter and a DC-DC converter (both not illustrated). The PCU 58 is attached to, for example, the case for the driving motor 56. The inverter converts dc power supplied from the main battery 50 to ac power to supply it to the driving motor 56, and converts ac power generated by the driving motor 56 to dc power to output it to the main battery 50. The DC-DC converter is disposed between the main battery 50 and the inverter to convert input power to an appropriate voltage and then output it to devices that need it. Specifically, the DC-DC converter converts power supplied from the main battery 50 to an appropriate voltage and then outputs it to the inverter or the auxiliary battery 52. The DC-DC converter converts power generated by the driving motor 56 to a required voltage and then outputs it to the main battery 50.

Further, the DC-DC converter is electrically connected to the charging port 25, and converts power supplied from an external power supply to an appropriate voltage and then outputs it to the main battery 50. As external power is supplied to the main battery 50 via the DC-DC converter, the main battery 50 is charged externally. In an embodiment, the external power supply may be an ac power supply, and a charger for converting ac power to dc power may be additionally provided between the charging port 25 and the DC-DC converter. In this embodiment, the charger may be disposed in the power unit compartment 48. By disposing the charger in the power unit compartment 48, an electric wire extending from the charging port 25 via the charger to the DC-DC converter can be shortened and can be simplified.

As for the power unit compartment 48, the charging port 25 electrically connected to the PCU 58 is disposed in the rear of the vehicle 10 (according to the illustrated example, on the rear surface of the vehicle 10). With this structure, an electric wire extending from the charging port 25 to the PCU 58 can be shortened. Although, according to the illustrated example, the charging port 25 is disposed on the rear surface in the rear of the vehicle, the charging port 25 may be disposed anywhere on an outer surface, not only on the rear surface but also on a side surface, in the rear of the vehicle 10. In an embodiment, the power unit compartment 48 may be disposed in the front bottom part of the vehicle 10 rather than the rear bottom part, and the charging port 25 may be disposed anywhere on an outer surface in the front of the vehicle.

The power unit compartment 48 further houses the auxiliary battery 52 and the sub-battery 54. The auxiliary battery 52 and the sub-battery 54 are disposed more toward the inside in the front-to-rear direction of the vehicle than the driving motor 56. In other words, the auxiliary battery 52 and the sub-battery 54 are disposed between the driving motor 56 and the main battery 50. The auxiliary battery 52 is a separate battery that is provided separately from the main battery 50 for operating electrical components such as a controller of the vehicle 10 (for example, the ECU 60). The auxiliary battery 52 is charged from the main battery 50 via the DC-DC converter.

The sub-battery 54 is a backup power source for supplying power to electrical components as an emergency measure when the auxiliary battery 52 has lost power. As, in an emergency, the sub-battery 54 supplies power only to electrical components that are necessary for securing safety, the sub-battery 54 is a lower voltage and smaller size battery than the auxiliary battery 52. As illustrated in FIG. 5, the sub-battery 54 is disposed adjacent to the auxiliary battery 52 in the vehicle width direction.

As illustrated in FIG. 7, the ECU 60 is disposed above the PCU 58. The ECU 60 is configured to control driving of various types of actuators mounted on the vehicle 10 and is, for example, a microcomputer that includes a CPU for performing various types of computations and a memory for storing various types of data. Results of detection obtained by various types of sensors mounted on the vehicle 10 are input to the ECU 60. Information transmitted from the party at the other end of communication that is located outside the vehicle (for example, from another vehicle or from a control center located outside the vehicle) is also input to the ECU 60. The ECU 60 performs computational processing on these results of detection obtained by the sensors and information obtained through communications by means of a microcomputer, and outputs electrical control signals to various types of actuators through an output processing circuit.

A partition 100 is provided between the ECU 60 and the PCU 58 for separating spaces where they are placed. This partition 100 limits heat transfer between the space where the ECU 60 is placed and the space where the PCU 58 is placed. This can prevent heat generated from one of the ECU 60 and the PCU 58 from adversely affecting the other. The partition 100 may be configured in any manner that can limit heat transfer, and does not have to completely separate the spaces where the ECU 60 and the PCU 58 are placed. Therefore, the partition 100 may have a small gap or hole somewhere in the middle.

The heat exchange unit 62 is disposed toward the rear of the driving motor 56 (in other words, toward the outside in the front-to-rear direction of the vehicle). The heat exchange unit 62 is configured to exchange heat between coolant and outside air efficiently, and includes a radiator 74 and an electric fan 76. The radiator 74 is a heat exchanger for exchanging heat between coolant and outside air, and is a flat component having a generally rectangular shape as viewed from the front. A plurality of passages via which coolant flows are formed in the radiator 74, and gaps via which outside air can pass through the radiator 74 in the thickness direction are provided around the passages. The coolant that flows in the radiator 74 may be air conditioner coolant that is used for conditioning air inside the cabin or may be a motor cooling coolant that is used for cooling the driving motor 56. The radiator 74 may be composed of two radiators, a radiator in which air conditioner coolant flows and a radiator in which motor cooling coolant flows, disposed in the same plane and integrated into one unit. The electric fan 76 is disposed toward the rear of the radiator 74, or, in other words, on the downstream side of travel wind that is created as the vehicle travels. As the electric fan 76 rotates, it generates wind that blows in the same direction as the travel wind and that passes through the radiator 74. According to the illustrated example, as denoted by the chain double-dashed line in FIG. 7, as the electric fan 76 is driven, it generates a flow of outside air coming from below the vehicle 10, passing through the radiator 74 and the electric fan 76 to flow toward the grille 20.

The radiator 74 and the electric fan 76 are joined together by a frame component 77 (not illustrated in FIG. 5; see FIG. 7) that surrounds their peripheries, and form a single unit serving as the heat exchange unit 62. As illustrated in FIG. 7, the rear end of the heat exchange unit 62 is located more toward the rear (toward the outside) than the rear end of the ECU 60. As such, a collision load that is input from the rear of the vehicle at the time of a rear collision is received by the heat exchange unit 62 before the ECU 60. The frame component 77 and the radiator 74 disposed in the heat exchange unit 62 are relatively stiff and robust. As a collision load is input to the heat exchange unit 62 before the ECU 60, a collision load that is input to the ECU 60 can be reduced or eliminated, and damage to the ECU 60, which is costly, can be retarded effectively.

As can be clearly understood from the foregoing description, according to the illustrated example, the driving motor 56, the PCU 58, the auxiliary battery 52, and the ECU 60, which are electrically connected to each other, are placed in the power unit compartment 48, which is a space below the rear seat 34. With this structure, electric wires that connect these components can be simplified and shortened. As the space below the rear seat 34 can serve effectively as the power unit compartment 48, dead space can be reduced, and a large cabin space can be provided. While the main battery 50 is large and difficult to place in the power unit compartment 48, according to the illustrated example, the main battery 50 is shaped flat and placed under the cabin floor adjacent to the power unit compartment 48. With this placement, the underfloor space can be used effectively without wasting space, and the electric wire between the main battery 50 and the PCU 58 can be shortened.

Further, the structure according to the illustrated example also includes the sub-battery 54 in addition to the auxiliary battery 52. With this structure, as minimum required power can be supplied under abnormal conditions of the auxiliary battery 52, the reliability of the vehicle 10 is improved. According to the illustrated example, the auxiliary battery 52 and the sub-battery 54 are disposed opposite the heat exchange unit 62 with the driving motor 56 interposed between them, or, in other words, more toward the inside in the front-to-rear direction of the vehicle than the driving motor 56. With this structure, because, at the time of a rear collision, the collision load is received by, for example, the heat exchange unit 62 before it is input to, for example, the auxiliary battery 52, damage to the auxiliary battery 52 and the sub-battery 54 can be prevented effectively. In particular, as the sub-battery 54 is a backup power source, it should function in an emergency as well. As this sub-battery 54 is disposed more toward the inside in the front-to-rear direction of the vehicle than the heat exchange unit 62 and the driving motor 56, damage to the sub-battery 54 can be prevented effectively, and in turn, the reliability of the vehicle 10 can be improved. As, for example, the auxiliary battery 52 is not disposed between the driving motor 56 and the heat exchange unit 62, heat generated around the driving motor 56 and the PCU 58 does not stay there and is easily discharged to the outside through the radiator 74 and the electric fan 76.

It should be noted that the above-described structure is an example and may be modified in any manner other than the requirements that the main battery 50 is disposed under the cabin floor and that the driving motor 56, the PCU 58, the auxiliary battery 52, and the ECU 60 are disposed in the power unit compartment 48 formed under a seat. Although, for example, according to the illustrated example, the space below the rear seat 34 serves as the power unit compartment 48, the power unit compartment 48 may be formed below the front seat 30. In this embodiment, the driving motor 56 may be disposed toward the rear of the heat exchange unit 62, and the auxiliary battery 52 and the sub-battery 54 may be disposed toward the rear of the driving motor 56. The heat exchange unit 62 does not necessarily have to be disposed in the power unit compartment 48. As such, for example, the heat exchange unit 62 may be disposed in the space below the front seat 30, and, for example, the driving motor 56 may be disposed in the space below the rear seat 34 (the power unit compartment 48). Also, examples of the vehicle 10 are not limited to electric vehicles but may include hybrid electric vehicles or fuel cell automobiles. Further, the vehicle 10 may be a vehicle that does not have an automated driving function.

The invention claimed is:

1. An electrically powered vehicle having a generally rectangular appearance, comprising:
    a seat disposed in a front or a rear of a cabin of the vehicle for allowing a vehicle occupant to sit thereon facing toward a center in the front-to-rear direction of the vehicle;
    a main battery disposed under a floor in a center of the cabin;
    a power unit compartment disposed below the seat, the power unit compartment being separated from the cabin;
    a driving motor disposed in the power unit compartment;
    a PCU disposed in the power unit compartment and above the driving motor for controlling power distribution;
    an ECU disposed in the power unit compartment and above the PCU for controlling one or more actuators mounted on the vehicle; and
    an auxiliary battery disposed in the power unit compartment.

2. The electrically powered vehicle according to claim 1, further comprising a heat exchange unit including a heat exchanger and an electric fan, the heat exchange unit being disposed in the power unit compartment and more toward the outside in the front-to-rear direction of the vehicle than the driving motor,
    wherein an outer end of the heat exchange unit as viewed in the front-to-rear direction of the vehicle is located more toward the outside in the front-to-rear direction of the vehicle than the ECU.

3. The electrically powered vehicle according to claim 1, further comprising a sub-battery disposed in the power unit compartment for outputting power when the auxiliary battery has lost power,
    wherein the auxiliary battery and the sub-battery are disposed more toward the inside in the front-to-rear direction of the vehicle than the driving motor.

4. The electrically powered vehicle according to claim 1, further comprising a charging port electrically connected to the PCU for allowing insertion of an external power supply charging plug,
    wherein the power unit compartment is disposed in a front bottom of the vehicle, and the charging port is disposed on an outer surface in the front of the vehicle, or
    wherein the power unit compartment is disposed in a rear bottom of the vehicle, and the charging port is disposed on an outer surface in the rear of the vehicle.

5. The electrically powered vehicle according to claim 1, further comprising a partition disposed in the power unit compartment and between the ECU and the PCU for separating spaces where the ECU and the PCU are placed.

* * * * *